(12) United States Patent
Astwood et al.

(10) Patent No.: US 8,758,664 B2
(45) Date of Patent: *Jun. 24, 2014

(54) METHOD FOR FORMING COMPOSITE COMPONENTS AND TOOL FOR USE THEREIN

(75) Inventors: Simon Astwood, Bristol (GB); Steven Evans, Bristol (GB)

(73) Assignee: Airbus Operations Limited, Bristol (GB)

( * ) Notice: Subject to any disclaimer, the term of this patent is extended or adjusted under 35 U.S.C. 154(b) by 71 days.

This patent is subject to a terminal disclaimer.

(21) Appl. No.: 12/929,792

(22) Filed: Feb. 16, 2011

(65) Prior Publication Data

US 2011/0147994 A1    Jun. 23, 2011

Related U.S. Application Data

(63) Continuation of application No. 12/213,931, filed on Jun. 26, 2008, now Pat. No. 7,922,957.

(30) Foreign Application Priority Data

Jun. 28, 2007    (GB) ................................... 0712535.4

(51) Int. Cl.
    *B29C 43/04*    (2006.01)
(52) U.S. Cl.
    USPC .......................................... 264/313; 425/457
(58) Field of Classification Search
    USPC ................................. 264/232, 257–258, 373
    See application file for complete search history.

(56) References Cited

U.S. PATENT DOCUMENTS

| 4,388,263 | A | 6/1983 | Prunty |
| 5,073,589 | A | 12/1991 | Milovich et al. |
| 5,387,098 | A | 2/1995 | Wilden |
| 5,817,269 | A | 10/1998 | Younie et al. |
| 2005/0116136 | A1 | 6/2005 | Artz et al. |
| 2010/0024964 | A1* | 2/2010 | Ingram et al. ................. 156/189 |

FOREIGN PATENT DOCUMENTS

| GB | 2 131 934 | 11/1984 |
| GB | 2 316 036 | 2/1998 |
| JP | 62280027 | 12/1987 |
| JP | 03262607 | 11/1991 |

OTHER PUBLICATIONS

UK Search Report dated Aug. 17, 2007 for GB Application No. 0712535.4.

* cited by examiner

*Primary Examiner* — Larry Thrower
*Assistant Examiner* — Xue Liu
(74) *Attorney, Agent, or Firm* — Nixon & Vanderhye P.C.

(57) ABSTRACT

A method of making an aircraft component is provided, wherein the method comprises the steps of:
providing a mold (1) for the receipt of a material (3) from which the aircraft component is to be made
providing the mold with said material
providing an intensification tool (14) in spaced relationship to the mold and
heating the material, tool and mold so that the tool expands and applies pressure to the material and so as to form the component and
wherein the linear coefficient of thermal expansion of the tool in a first direction is matched to the coefficient of thermal expansion of the component in the first direction, and the coefficient of thermal expansion of the tool in a second direction is greater than the coefficient of thermal expansion of the component in the second direction, the tool being provided with at least one contacting surface for contacting the material and through which pressure is applied to the material, the expansion of the tool in the second direction causing the at least one contacting surface to contact, and exert pressure on, the material.

13 Claims, 3 Drawing Sheets

METHOD FOR FORMING COMPOSITE COMPONENTS AND TOOL FOR USE THEREIN

This application is a Continuation of application Ser. No. 12/213,931, filed Jun. 26, 2008, which claims priority to GB Application No. 0712535.4 filed 28 Jun. 2007. The entire contents of these applications are incorporated herein by reference.

TECHNICAL FIELD OF THE INVENTION

The present invention relates to a method suitable for forming composite components and a tool for use in such a method. The method may also be used to form other components using a moulding process.

BACKGROUND OF THE INVENTION

Composite components may be manufactured using moulding processes using a mould to form a component during a forming process, in which heat and pressure are typically applied. The mould provides a surface which forms a component surface having a complementary shape to the mould surface. Intensification tools ("intensifiers") are sometimes used in carbon fibre reinforced plastic component manufacture. Intensifiers enable the surface of the component which is not in contact with the mould tool to be moulded with greater precision. Intensifiers also assist in reducing the bulk volume of the component during the forming process. This debulking removes air from the material to help avoid undesirable voids in the final component. The intensifiers typically rely on the thermal expansion of the intensifier material during the forming process to apply pressure to the component. Therefore, intensifiers are often made from materials (such as aluminium) with coefficients of thermal expansion which are high relative to the coefficients of expansion of the component. Alternatively or additionally, an autoclave will typically be used to apply pressure during the forming process.

It is known to use intensifiers to control internal component dimensions for components manufactured using the VAP (Vacuum Assisted Process) system developed by EADS Military Air Systems, Augsburg. The tooling comprises a mould tool and an intensifier, where the intensifier is manufactured from a material with a higher coefficient of thermal expansion than the mould. The VAP process does not rely on an autoclave for pressure so component consolidation is achieved by allowing the intensifier to expand in all dimensions inside the mould and compress the component.

It is also known to use intensification tools in a process known as the RTI (Resin Transfer Injection) process. The intensifiers are manufactured from an airpad bag, which is constructed from carbon fibre and silicone. The carbon fibre helps to retain the tool's shape whilst the silicone expands to consolidate the component. The intensifier expands evenly in all directions.

The applicants have recognised that processes using intensifiers with a high coefficient of thermal expansion in three dimensions suffer from problems when used for long components. For example, as a result of the intensifier having a high thermal expansion coefficient (as is required to cause sufficient compression of the component-forming material), the intensifier expands lengthwise by an amount that makes it difficult to form accurately local changes in geometry in the component at the desired locations in the lengthwise direction.

SUMMARY OF THE INVENTION

The present invention seeks to mitigate one or more of the above-mentioned problems.

In accordance with a first aspect of the present invention, there is provided a method of making a composite component, wherein the method comprises the steps of:
providing a mould for the receipt of a material from which the component is to be made;
providing the mould with said material;
providing an intensification tool in spaced relationship to the mould; and
heating the material, tool and mould so that the tool expands and applies pressure to the material, and so as to form the component; wherein;
the linear coefficient of thermal expansion of the tool in a first direction is matched to the coefficient of thermal expansion of the component in the first direction, and the coefficient of thermal expansion of the tool in a second direction is greater than the coefficient of thermal expansion of the component in the second direction;
the tool being provided with at least one contacting surface for contacting the material and through which pressure is applied to the material, the expansion of the tool in the second direction causing the at least one contacting surface to contact, and exert pressure on, the material.

This first aspect of the present invention may be advantageous when making long components. In this case, the method of the first aspect of the present invention facilitates the matching of the lengthwise expansion of the intensification tool and the component, therefore enabling the accurate formation of local changes in geometry in the component at the desired locations in the lengthwise direction. Furthermore, the expansion on heating of the tool in a second direction (typically across the width of the tool) is greater than the expansion on heating of the component, and so the tool exerts a pressure on the material in the second direction, thus compressing the material.

The term "matched" indicates that the coefficients of thermal expansion of the tool and component in the first direction are sufficiently similar to one another that the difference in length of expansion between the tool and component, measured over the length of the component to be formed, when heated to the maximum operating temperature used in the method is below a pre-determined tolerance. The tolerance will depend on the specific component being manufactured. The skilled person will appreciate that the tolerance for a specific component being manufactured may readily be determined from the desired geometry of that component. The tolerance may for example be determined as a function of the maximum length between local variations in geometry. A typical tolerance may, for example, have a maximum value of no more than 5 mm, typically no more than 3 mm and in certain embodiments no more than 2 mm.

There now follows a description of optional features concerning the method of the first aspect of the present invention.

The difference between the coefficient of thermal expansion of the tool in the first direction and the co-efficient of thermal expansion of the component in the first direction is typically no more than $5 \times 10^{-6} K^{-1}$, further typically no more than $2 \times 10^{-6} K^{-1}$ and in certain embodiments no more than $10^{-6} K^{-1}$.

The coefficient of thermal expansion of the tool in the second direction may be at least 4 times (typically at least 6 times and in certain embodiments at least 8 times) greater than the coefficient of thermal expansion of the component in the second direction.

The coefficient of thermal expansion of the tool in the second direction may be greater than the coefficient of thermal expansion of the tool in the first direction.

In accordance with a second aspect of the present invention, there is provided a method of making a composite component, wherein the method comprises the steps of:

providing a mould for the receipt of a material from which the component is to be made;

providing the mould with said material;

providing an intensification tool in spaced relationship to the mould; and heating the material, tool and mould so that the tool expands and applies pressure to the material, and so as to form the component; wherein the coefficient of thermal expansion of the tool in a first direction is less than the coefficient of thermal expansion of the tool in a second direction;

the tool being provided with at least one contacting surface for contacting the material and through which pressure is applied to the material, the expansion of the tool in the second direction causing the at least one contacting surface to contact, and exert pressure on, the material.

The method of the second aspect of the present invention uses a tool with anisotropic coefficients of expansion. This is typically of use when it is desirable to match the coefficient of expansion of the tool with that of the component in the first direction, but when it is desirable to exert pressure on the material by having a tool with a coefficient of expansion that is greater than the coefficient of expansion of the component in the second direction.

There now follows a description of optional features concerning the methods of both the first and second aspects of the present invention.

The coefficient of thermal expansion of the tool in the second direction may be at least $10^{-5}K^{-1}$, typically at least $2 \times 10^{-5}K^{-1}$ and in certain embodiments at least $3 \times 10^{-5}K^{-1}$.

The coefficient of thermal expansion of the tool in the first direction may be no more than $10^{-5}K^{-1}$, typically no more than $5 \times 10^{-6}K^{-1}$ and in certain embodiments no more than $3 \times 10^{-6}K^{-1}$.

The coefficient of thermal expansion of the component in the first direction may typically be no more than $10^{-5}K^{-1}$, further typically no more than $5 \times 10^{-6}K^{-1}$ and in certain embodiments no more than $3 \times 10^{-6}K^{-1}$.

It is appreciated that the material will typically undergo some form of transformation during the production process, for example, the material is typically altered by the heating process. The material may comprise a resin-forming precursor which is initially in a liquid form. On heating, the precursor may be transformed into a solid resin. The material may comprise a reinforcing element (such as carbon fibre) and a precursor which, on heating, forms a matrix around the reinforcing element. The precursor may, on heating, form a resin. It will be understood from the foregoing that the use of the word "material" is intended to cover starting product(s) and intermediate product(s). The term "component" is intended to cover the fully cured product(s).

It will be appreciated that the steps of the methods of the first and second aspects of the present invention are not necessarily sequential or distinct. For example, one may inject a part of the material into a mould which has already been provided with the tool, the part of the material therefore being injected into a cavity between the mould and the tool. This may occur, for example, during a resin infusion process. Alternatively, the tool may be introduced after the material has been provided into the mould. An example of this may be the introduction of a prepreg into the mould.

The coefficient of thermal expansion of the tool in the second direction may typically be at least 4 times (further typically at least 6 times and in certain embodiments at least 8 times) greater than the coefficient of thermal expansion of the tool in the first direction.

The first direction may be substantially transverse to the second direction.

The tool may comprise a laminate. The normal to the plies of the laminate material may be substantially parallel to the second direction.

It is preferred that the component is an elongate component, such as a spar. In this case, it is preferred that the first direction corresponds to the lengthwise direction of the elongate component. The second direction may correspond to the width of the elongate component.

The tool may be U-shaped in section, and preferably elongate. The tool may comprise two flanges interconnected by a web, the web preferably being elongate. The first direction may correspond to the lengthwise direction of the web. The web may typically be substantially planar. The second direction may be substantially orthogonal to the first direction and may be in the plane of the web.

The web may comprise a laminate. The normal to the plies forming the laminate may not be parallel to the normal of plane of the web. The normal to the plies forming the laminate may be substantially parallel to the plane of the web. The normal to the plies forming the laminate may be substantially parallel to the second direction.

The shape of the tool may correspond to the shape of the component. For example, if the component is elongate, it is preferred that the tool is elongate. If the component is U-shaped in cross-section, it is preferred that the tool may be U-shaped in cross-section. If the component is W-shaped or N-shaped in cross-section, it is preferred that the tool may correspondingly be U-shaped or N-shaped in cross-section. A U-shaped component may comprise two component flanges interconnected by a component web. The component web may be elongate and may be substantially planar. The first direction may correspond to the length of the component web. The second direction may be in the plane of the component web.

The tool may have a length of at least 5 m, preferably a length of from 5 m to 20 m, and more preferably a length of from 6 m to 16 m.

In accordance with a third aspect of the present invention, there is provided an intensification tool for use in the methods of the first and second aspects of the present invention.

In particular, in accordance with a fourth aspect of the present invention, there is provided an intensification tool for exerting pressure on a material in a mould, when said material is heated to form a component, wherein:

the tool comprises at least one contacting surface for contacting the material;

the linear coefficient of thermal expansion of the tool in a first direction is less than the linear coefficient of thermal expansion of the tool in a second direction; and the tool is arranged such that in use thermal expansion of the tool in the second direction causes the at least one contacting surface to contact, and exert pressure on, the material.

Preferably the tool according to embodiments of the fourth aspect is made from a laminate material and substantially all of the plies of the laminate are arranged in substantially parallel alignment with the plane of the at least one contacting surface.

The tool of the third aspect of the present invention may comprise those features of the tool described above in relation to the methods of the first and second aspects of the present invention. For example, the tool may comprise a U-shaped structure, with two flanges interconnected by a web. The tool may be elongate.

The "first direction" and "second direction" referred to in the method of the second aspect of the present invention preferably corresponds to the "first direction" and "second direction" respectively as referred to in the method of the first aspect of the present invention. Likewise, the "first direction" and "second direction" referred to in relation to the tool of the third aspect of the present invention may preferably correspond to the "first direction" and "second direction" respectively referred to in the methods of the first and/or second aspects of the present invention.

In accordance with a fifth aspect of the present invention there is provided an apparatus comprising a tool in accordance with the third or fourth aspects of the present invention and a mould for forming a composite component.

In accordance with a sixth aspect of the present invention, there is provided a method of making an intensification tool in accordance with the third or fourth aspect of the present invention, the tool being substantially U-shaped in cross-section and having two flanges interconnected by a web, wherein the method comprises the steps of:

providing a mould for the formation of the web of the tool
introducing into the mould a plurality of plies of web-forming material so as to form a stack, the normal to the plies being non-parallel to the normal to the plane of the web and heating the stack so as to form the web.

Heating may take place in an autoclave. The web may be machined post-heating to achieve a desired shape or finish.

The angle between the normal to the plies and the normal to the web may typically be at least 80 degrees. The normal to the plies may be orthogonal to the normal to the web. The normal to the plies forming the laminate may be substantially parallel to the second direction.

The direction of stacking of the plies may correspond to the width of a tool with a U-shaped cross-section.

The tool may then be completed by co-curing the web with two side portions, each side portion comprising a flange.

DESCRIPTION OF THE DRAWINGS

The present invention will now be described by way of example only with reference to the following Figures of which.

DETAILED DESCRIPTION

Figure 1:
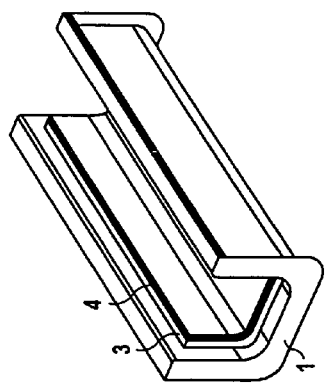
FIG. 1 is a schematic perspective view of a component being formed between a mould and an intensification tool, the intensifier tool being a known tool.
Figure 3:
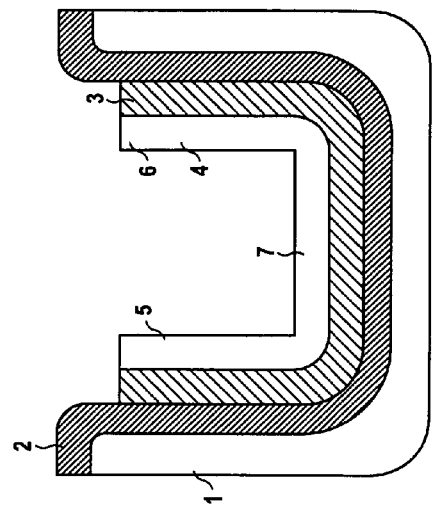
FIG. 3 is a cross-section through the mould-tool-component ensemble of FIGS. 1 and 2.
Figure 2:
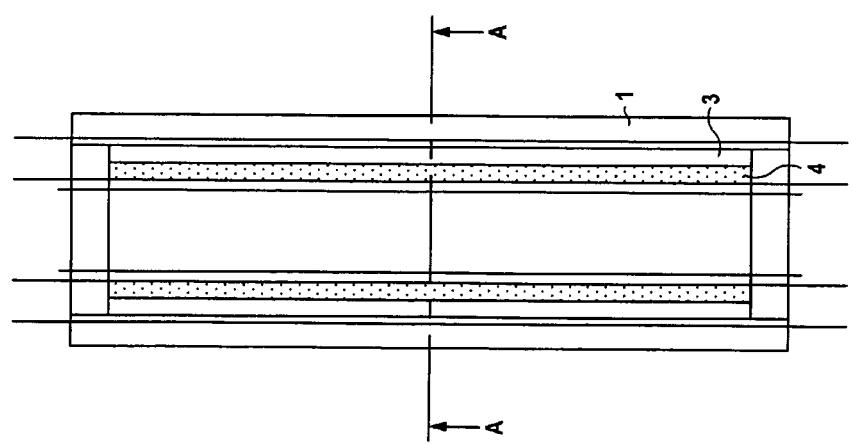
FIG. 2 is a plan view of the mould-tool-component ensemble of FIG. 1.

A known method of making a component is now described with reference to FIGS. 1, 2 and 3. FIGS. 1, 2 and 3 show the spatial relationship between an intensification tool (shown generally by reference numeral 4), the material 3 from which the component is to be made and a mould (shown generally by reference numeral 1) that is used to make a component. The intensification tool 4 is brought into spatial relationship with the mould so as to form a cavity into which material 3 may be provided. Material (for example, in the form of reinforcing fibres dispersed in a matrix-forming precursor) is introduced into the cavity.

The material 3 is then heated whilst pressure is applied to the material by the intensification tool 4 (due to thermal expansion as described above). The material is heated until it reaches its desired cure temperature and the material is then held at this temperature for a pre-determined period of time (the dwell time) causing the formation of the component, heating of the matrix-forming precursor causing the formation of a matrix, the matrix being reinforced by fibres. The matrix-forming precursor may be a curable resin precursor (for example epoxy resin), wherein heating the precursor to the curing temperature causes the formation of the resin. The component is formed on curing of the precursor. The component takes the shape of the mould at the cure of the resin.

The application of pressure by the intensification tool 4 causes compression of the material, thus consolidating (or debulking) the material from which the component is formed. Application of pressure by the intensification tool 4 is able to form a surface of the component having a well-defined geometry. Use of an intensification tool may reduce the need to machine the component post-heating.

The mould 1 is provided with a U-shaped, component forming surface which is defined by laminate structure 2. The laminate structure is shown in FIG. 3. The mould is made from a laminate material, for example a carbon fibre reinforced plastic such as LTM211, which has a coefficient of thermal expansion of $2.5 \times 10^{-6} K^{-1}$ in the plane of the plies and $3.1 \times 10^{-5} K^{-1}$ normal to the plane of the plies.

The component is formed form a fibre reinforced composite material, for example in this embodiment a material from which the component is formed is Hexcel M21E-IMA. The material is deposited in a laminate structure so that a laminate component is formed. The component has a coefficient of thermal expansion of $2.8 \times 10^{-6} K^{-1}$ in the plane of the plies and $3.2 \times 10^{-5} K^{-1}$ normal to the plane of the plies. The laminate structure of the material from which the component is to be made is essentially the same as the mould in that the plies of the mould and material are essentially parallel to the U-shaped surface of the mould which defines the shape of the component. The coefficients of thermal expansion of the component are matched to the coefficients of thermal expansion of the laminate structure 2 of the mould 1. Hence, the component will expand by about the same amount as the mould in all directions. This means that it is possible to form accurately local changes in geometry in the component at the desired locations in the lengthwise direction. This is important in the example given because the mould and component are long, so the effect of any mismatch between the mould and the component in expansion coefficient will be more pronounced over large distances.

The hatched region in FIG. 3 is used to clearly differentiate the material 3 from the mould 1 and tool 4. The hatching does not represent the ply structure within material 3. The laminate structure of material 3 is discussed above.

The intensification tool 4 is elongate and substantially U-shaped in cross-section with two flanges 5, 6 interconnected by a web 7. The tool is made from a metallic material (such as aluminium) which has a high coefficient of expansion. The high coefficient of expansion of the intensification tool 4 ensures that flanges 5, 6 are urged into the material from which the component is formed and so effective consolidation of the material is achieved. However, the tool expands more than desired in a lengthwise direction because of the high coefficient of expansion of the intensification tool 4.

Figure 4:
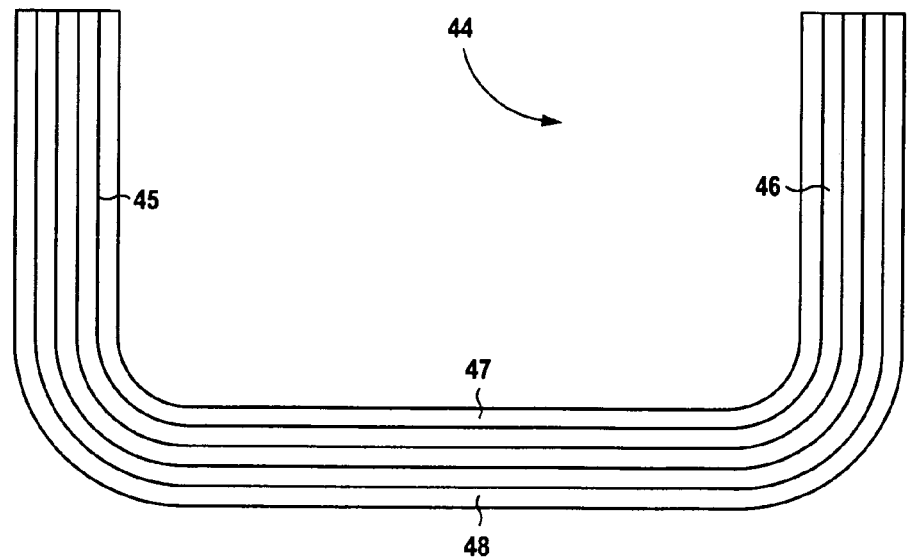
FIG. 4 is a schematic cross-section of a U-shaped carbon-fibre member having a conventional ply lay-up.

FIG. 4 shows how the plies of a U-shaped carbon-fibre member, such as an intensification tool, would conventionally be laid-up. The intensification tool 44 is substantially U-shaped in cross-section with two flanges 45, 46 interconnected by a web 47. The planes of the plies (one of which is labelled 48) in the web are substantially parallel to the surface of the web. The plies in the flanges 45, 46 are parallel to the internal and external surfaces of the flanges.

The method described above with reference to FIGS. 1, 2 and 3 may be adapted to provide a method in accordance an embodiment of the present invention. This may be done by replacing the prior art intensification tool 4 with an intensification tool in accordance with an embodiment of the present invention.

Figure 5:
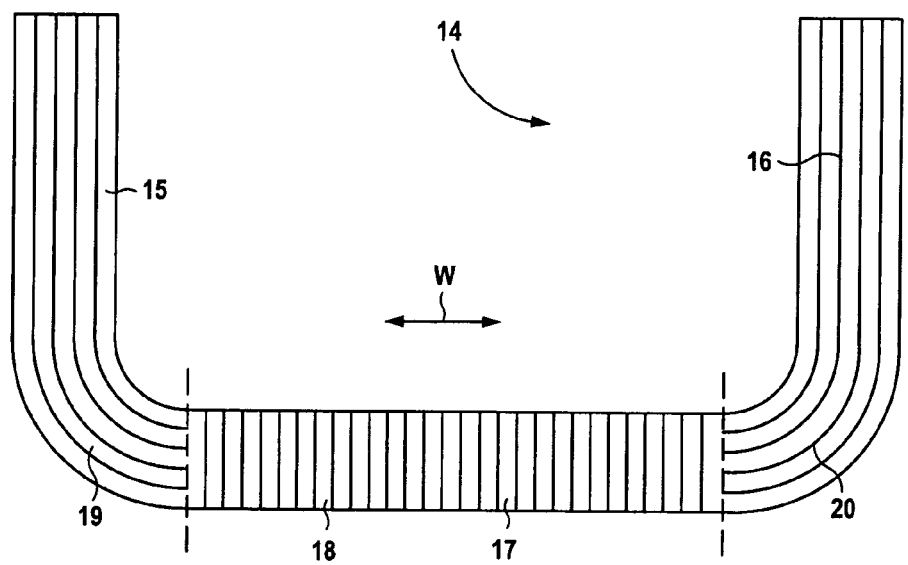
FIG. 5 is a schematic cross-section through an intensification tool in accordance with an embodiment of the present invention.

An example of such a tool in accordance with an embodiment of the present invention is shown in FIG. 5. The tool 14 is substantially U-shaped in cross-section, with two flanges 15, 16 projecting from an interconnecting web 17. The tool 14 is made from a laminate material. The plies in the flanges 15, 16 are parallel to the internal and external surfaces of the flanges. The planes of the plies (one of which is labelled 18) in the web are substantially normal to the surface of the web. The tool 14 is made from cured LTM-211 (Advanced Composites Group).

The coefficient of expansion of the tool 14 along the length of the tool is the in-plane coefficient of expansion ($2.5 \times 10^{-6} K^{-1}$), which is lower than the out of plane coefficient of expansion ($3.1 \times 10^{-5} K^{-1}$). Therefore the coefficient of expansion may be considered to match the coefficient of expansion of the component ($2.8 \times 10^{-6} K^{-1}$) in the lengthwise direction. This means that it is possible to form accurately local changes in geometry in the component at the desired locations in the lengthwise direction.

A further advantage of the tool is that, the web 17 has its highest (out of plane) coefficient of expansion of the tool oriented in the width direction. This means that the coefficient of expansion of the web 17 across the width of the tool 14 is the coefficient of expansion normal to the plies i.e. $3.1 \times 10^{-5} K^{-1}$. The coefficient of expansion of the component in the same "width" direction is $2.6 \times 10^{-6} K^{-1}$. Thus, during the heating process, associated with curing the material to form the component, flanges 15, 16 are urged into the corresponding flanges of the material, compressing the material and reducing its volume.

Those skilled in the art will realise that in the tools of FIGS. 5, the width of the flanges relative to the width of the web is relatively small and so the contribution that the flanges make to the coefficient of thermal expansion of the tool in a direction corresponding to the width of the tool may be negligible.

A method of making a tool in accordance with an embodiment of the present invention is now described with reference to FIGS. 5 and 6. Web 17 is made by stacking plies 20, 21, 22, 23, 24, 25 of tool-forming material on top of each other in a tool mould 26. The stacking direction of the plies corresponds to the width of the web 17. Once the required number of plies has been reached, the stack is heated in the tool mould in an autoclave to form the web 17. The web may be machined, if necessary. Referring to FIG. 5, web 17 is incorporated into tool 14 as follows. Web 17 is introduced into a mould (not shown) and side portions 19, 20 are formed by laying up plies of material in the mould around the web 17. The mould is then heated in an autoclave to co-bond the side portions to the web 17, thus forming a U-shaped tool 14.

Whilst the present invention has been described and illustrated with reference to particular embodiments, it will be appreciated by those of ordinary skill in the art that the invention lends itself to many different variations not specifically illustrated herein.

By way of example, the material from which the component is formed may comprise a prepreg. In this case, the plies of prepreg material are placed onto the mould to the desired thickness and the intensification tool brought into spaced relationship with the mould once the plies of prepreg have been laid down.

Alternatively, plies of reinforcement members may be placed onto the mould to the desired thickness and the intensification tool brought into spaced relationship with the mould once the plies of reinforcement members have been laid down. Matrix-forming precursor may then be introduced around the reinforcement members.

In yet another embodiment of the invention, the method of producing a component may use a tool with a substantially isotropic the tool is made from a laminate material and substantially all of the plies of the laminate substantially parallel alignment with the plane of at least one contacting surface, if this coefficient of expansion is matched to the coefficient of expansion of the component in a first direction and if the coefficient of thermal expansion of the tool is greater than the coefficient of expansion of the component in a second direction.

Figure 6:
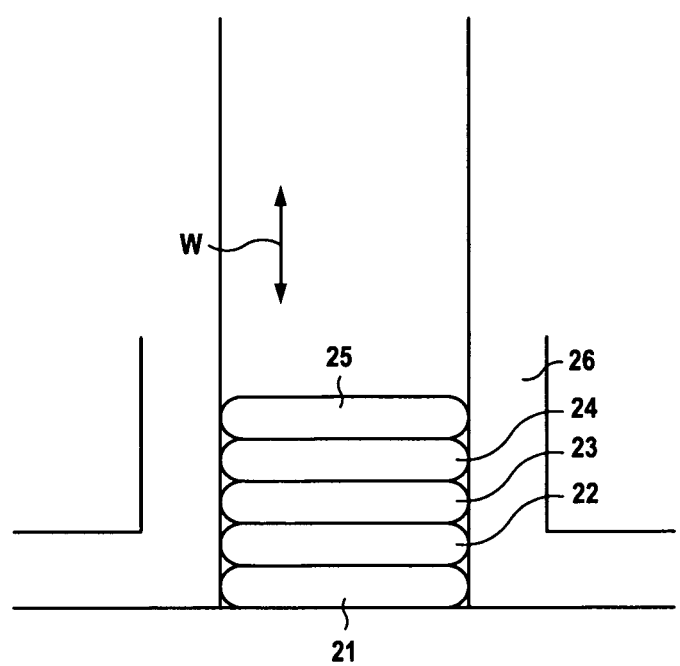
FIG. 6 is a schematic cross-section through a pattern tool showing the manufacture of an intensification tool in accordance with an embodiment of the present invention.

In yet another embodiment of the invention, the web of FIGS. 5 and 6 may be bonded onto side portions which have already been cured, as opposed to being co-bonded with the side portions. Cured side portions may be mechanically fastened to the web.

It will be clear to those skilled in the art that an intensification tool in accordance with an embodiment of the present invention need not be U-shaped.

In the tool of FIG. 5, substantially all of the plies of the laminate (in both the flanges and the web) are arranged in substantially parallel alignment with the plane of the contacting surfaces of the flanges. Accordingly the coefficient of thermal expansion in the normal direction to the contacting surface is dominated by (and may substantially corresponds to) the coefficient of thermal expansion out-of-plane, or cross-ply, direction (which as described above is greater than in the in-plane, or through-ply, direction). This ply orientation helps to ensure that the plane of greatest expansion of the tool is generally aligned with the pressure force that will be applied to the material. Those skilled in the art will appreciate that such an arrangement of plies may be readily applied to any shape of intensification tool.

Of course, features described with reference to one particular embodiment of the invention may be equally applicable to other embodiments on the invention.

Those skilled in the art will realise that the plying shown in the Figures may be indicative of the orientation of the plies, and is not indicative of the thickness of the plies. Each ply is, in reality, thinner than indicated in the Figures.

It will be appreciated by those skilled in the art that the embodiments of the invention may be particularly suitable for manufacturing aircraft components. For example, aircraft components may require relatively complex geometries. Additionally or alternatively, aircraft components may require relatively large single piece components to be manufactured. It will also be appreciated that aircraft composite components often use high temperature resin systems and that the higher the temperature at which the component is formed the more significant the effects of thermal expansion.

It is also generally of increased importance to ensure that aircraft components are debulked and free of voids.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An apparatus comprising an intensification tool for exerting pressure on a material placed between said tool and a mould when said material is heated to form a component, said mould for forming an aircraft component from said material placed between said mould and said tool, the tool comprises at least one contacting surface for contacting the material;
   the linear coefficient of thermal expansion of the tool in a first direction is less than the linear coefficient of thermal expansion of the tool in a second direction;
   the co-efficient of thermal expansion of the mould in said first direction is matched to the coefficient of thermal expansion of the tool in said first direction; and
   the tool is configured such that thermal expansion of the tool in the second direction causes the at least one contacting surface to contact and exert pressure on the material.

2. An apparatus comprising an intensification tool for exerting pressure on a material in a mould, when said material is heated to form a component, a mould for forming an aircraft component from material placed between the mold and the tool, said tool comprising at least one contacting surface for contacting the material, wherein the tool is U-shaped in cross-section and is elongate, the tool comprising two or more flanges interconnected by an elongate, planar web comprising a laminate comprising a plurality of plies, the coefficient of thermal expansion of the tool in a first direction corresponding to the lengthwise direction of the web being less than the coefficient of thermal expansion of the tool in a second direction, the second direction being substantially orthogonal to the length of the web and in the plane of the web, wherein the normal to the plies forming the laminate is substantially parallel to the second direction.

3. An intensification tool for exerting pressure on a material in a mould, when said material is heated to form a component wherein:
   said tool comprises at least one contacting surface for contacting the material,
   said tool having a linear coefficient of thermal expansion in a first direction which is less than a linear coefficient of thermal expansion in a second direction, and
   said tool is configured such that thermal expansion of the tool in the second direction causes said at least one contacting surface to contact and exert pressure on, the material, wherein the tool is U-shaped in cross-section and is elongate, the tool comprising two or more flanges interconnected by an elongate, planar web, wherein said first direction corresponds to a lengthwise direction of the web, and the second direction is substantially orthogonal to the length of the web and in the plane of the web.

4. A tool according to claim 3, wherein said web comprises a laminate including a plurality of plies, a normal to said plies is substantially parallel to said second direction.

5. An apparatus according to claim 1, wherein said tool is U-shaped in cross-section and is elongate, said tool comprising at least two flanges interconnected by an elongate planar web.

6. An apparatus according to claim 1, wherein said planar web comprises a laminate comprised of a plurality of plies.

7. An apparatus according to claim 6, wherein the coefficient of thermal expansion of the tool in said first direction, corresponding to the lengthwise direction of the web, is less than the coefficient of thermal expansion of the tool in said second direction, said second direction is substantially orthogonal to the length of the web and in the plane of the web, wherein the normal to the plies forming the laminate is substantially parallel to the second direction.

8. A method of making a composite component using the apparatus according to claim 1, said method comprising the steps of:
   providing material from which said component is to be made in spaced relationship with the intensification tool and mould wherein the co-efficient of thermal expansion of the tool in the first direction is matched to the coefficient of thermal expansion of the component in the first direction, and the coefficient of thermal expansion of the tool in the second direction is greater than the coefficient of thermal expansion of the component in the second direction;
   positioning said material between said intensification tool and said mould;
   heating the material, tool and mould causing the tool to expand and apply pressure to the material against the mould, the expansion of the tool in the second direction causing the at least one contacting surface to contact and exert pressure on the material;
   curing the material thereby forming the component; and
   removing the component from the mould.

9. A method according to claim 8, wherein said tool includes a plurality of plies in one direction and a direction normal to said one direction, further including the step of orienting said one direction substantially parallel to said first direction and said normal direction substantially parallel with said second direction.

10. A method according to claim 8 for the manufacture of an elongate component, wherein the first direction corresponds to the lengthwise direction of the elongate component.

11. A method according to claim 10 wherein the second direction corresponds to the width of the elongate component.

12. A method according to claim 8 wherein the tool is U-shaped in cross-section and is elongate, wherein the tool comprises two or more flanges interconnected by an elongate web.

13. A method according to claim 12, wherein the tool comprises two flanges and wherein the web is planar, the first direction corresponding to a lengthwise direction of the web and the second direction being substantially orthogonal to the first direction and in the plane of the web and wherein the web comprises a laminate comprising plies in one direction, and a direction normal to said plies, the normal to the plies in one direction forming the laminate and not parallel to a normal of the plane of the web.

* * * * *